US011134669B2

(12) United States Patent
Yanagawa et al.

(10) Patent No.: US 11,134,669 B2
(45) Date of Patent: Oct. 5, 2021

(54) METHOD FOR KILLING PTERIOMORPHIA AND BARNACLES USING LIGHT IRRADIATION

(71) Applicants: THE CHUGOKU ELECTRIC POWER CO., INC., Hiroshima (JP); SESSILE RESEARCH CORPORATION, Hyogo (JP)

(72) Inventors: Toshiharu Yanagawa, Hiroshima (JP); Shinsuke Saito, Hyogo (JP); Keiji Yamashita, Hyogo (JP); Kyoko Kamiya, Hyogo (JP); Yoshio Hayashi, Hyogo (JP)

(73) Assignees: THE CHUGOKU ELECTRIC POWER CO., INC., Hiroshima (JP); SESSILE RESEARCH CORPORATION, Hyogo (JP)

( * ) Notice: Subject to any disclaimer, the term of this patent is extended or adjusted under 35 U.S.C. 154(b) by 0 days.

(21) Appl. No.: 15/128,213

(22) PCT Filed: Mar. 24, 2014

(86) PCT No.: PCT/JP2014/058010
§ 371 (c)(1),
(2) Date: Mar. 6, 2017

(87) PCT Pub. No.: WO2015/145527
PCT Pub. Date: Oct. 1, 2015

(65) Prior Publication Data
US 2017/0172135 A1    Jun. 22, 2017

(51) Int. Cl.
*A01M 29/10*    (2011.01)
*C02F 1/30*    (2006.01)
*E02B 1/00*    (2006.01)
*C02F 3/32*    (2006.01)
*E04B 1/72*    (2006.01)
*C02F 103/08*    (2006.01)

(52) U.S. Cl.
CPC .............. *A01M 29/10* (2013.01); *C02F 1/30* (2013.01); *C02F 3/327* (2013.01); *E02B 1/006* (2013.01); *E04B 1/72* (2013.01); *C02F 2103/08* (2013.01); *C02F 2303/20* (2013.01); *Y02W 10/10* (2015.05)

(58) Field of Classification Search
CPC ...... A01M 29/10; A01M 29/24; A01M 29/28; C02F 1/30; E02B 1/006
See application file for complete search history.

(56) References Cited

U.S. PATENT DOCUMENTS

| 4,235,043 A | 11/1980 | Harasawa et al. |
| 4,336,223 A | 6/1982 | Hillman |
| 5,308,505 A * | 5/1994 | Titus ............... A61L 2/0011 210/745 |
| 5,320,749 A * | 6/1994 | Mullen ............... A61L 2/10 210/199 |
| 5,655,483 A * | 8/1997 | Lewis ............... A01M 19/00 119/720 |
| 6,149,343 A * | 11/2000 | Lewis ............... A01M 21/046 119/720 |
| 6,447,720 B1 | 9/2002 | Horton, III et al. |
| 7,329,538 B2 | 2/2008 | Wainwright et al. |
| 7,695,675 B2 | 4/2010 | Kaiser et al. |
| 8,240,312 B2 | 8/2012 | Feuerstein et al. |
| 2005/0147579 A1 | 7/2005 | Schneider et al. |
| 2005/0232960 A1 | 10/2005 | Buccolini et al. |
| 2008/0206095 A1 | 8/2008 | Duthie |
| 2011/0226966 A1 | 9/2011 | Takahashi et al. |
| 2012/0006995 A1 | 1/2012 | Greuel |
| 2016/0143257 A1 | 5/2016 | Yanagawa et al. |
| 2017/0164602 A1 | 6/2017 | Yanagawa et al. |
| 2017/0290326 A1 | 10/2017 | Yanagawa et al. |
| 2017/0290327 A1 | 10/2017 | Yanagawa et al. |

FOREIGN PATENT DOCUMENTS

| CN | 106793769 A | 5/2017 |
| EP | 2885968 A1 | 6/2015 |
| EP | 3124441 A1 | 2/2017 |
| JP | 5-228454 A | 9/1993 |
| JP | 6-218367 A | 8/1994 |
| JP | 07-037186 U | 7/1995 |
| JP | 7-265867 A | 10/1995 |
| JP | 8-164383 A | 6/1996 |
| JP | 8-164384 A | 6/1996 |
| JP | 11-37666 A | 2/1999 |
| JP | 11-196707 A | 7/1999 |
| JP | 11-278374 A | 10/1999 |
| JP | 2003-301435 A | 10/2003 |
| JP | 3605128 B2 | 12/2004 |
| JP | 2005-144212 A | 6/2005 |
| JP | 2005-144213 A | 6/2005 |

(Continued)

OTHER PUBLICATIONS

English translation of applicant submitted document Yanagawa (WO2014/027402) dated Feb. 20, 2014.*
Notification of Reason for Rejection for Japanese Patent Application No. 2015-559346, dated Feb. 9, 2016 (English language translation provided) (4 pages).
Decision of Rejection for Japanese Patent Application No. 2015-559346, dated May 10, 2016 (English language translation provided) (3 pages).
Extended European Search Report for European Patent Application No. 14886734.4, dated Feb. 21, 2017 (7 pages).
International Search Report for International Application No. PCT/JP2014/058010, dated May 20, 2014 (English language translation provided) (5 pages).

(Continued)

*Primary Examiner* — Monica L Barlow
*Assistant Examiner* — Aaron M Rodziwicz
(74) *Attorney, Agent, or Firm* — Clark & Elbing LLP

(57) ABSTRACT

The present invention provides a method of killing larvae of sessile invertebrates in the settlement stage in water, comprising the step of irradiating light comprising the spectrum of 409 to 412 nm, to the larvae in the settlement stage.

15 Claims, No Drawings

(56) References Cited

FOREIGN PATENT DOCUMENTS

| JP | 2005-144214 A | 6/2005 |
|---|---|---|
| JP | 2010-187637 A | 9/2010 |
| JP | 5301314 B2 | 9/2013 |
| WO | WO-98/30230 A1 | 7/1998 |
| WO | WO-2014/027402 A1 | 2/2014 |
| WO | WO-2014/188347 A1 | 11/2014 |
| WO | WO-2015/145527 A1 | 10/2015 |

OTHER PUBLICATIONS

Written Opinion of the International Search Authority for International Application No. PCT/JP2014/058010, dated May 20, 2014 (English language translation provided) (7 pages).
International Preliminary Report on Patentability for International Application No. PCT/JP2014/058010, dated Sep. 27, 2016 (English language translation provided) (9 pages).
International Search Report for International Application No. PCT/JP2012/070700, dated Nov. 20, 2012 (2 pages).
International Preliminary Report on Patentability for International Application No. PCT/JP2012/070700, dated Feb. 17, 2015 (6 pages).
English language translation of the Written Opinion of the International Searching Authority for International Application No. PCT/JP2012/070700, dated Nov. 20, 2012 (5 pages).
Kobak, "Impact of light conditions on geotaxis behaviour of juvenile *Dreissena polymorpha*," Folia Malacologica. 10(2):77-82 (2002).
Second Office Action for Chinese Patent Application No. 201280075871.9, dated Aug. 30, 2016 (English language translation provided) (10 pages).
Communication pursuant to Article 94(3) EPC for European Patent Application No. 12891404.1, dated Nov. 4, 2016 (5 pages).
Notice of Final Rejection for Korean Patent Application No. 10-2015-7005863, dated Dec. 27, 2016 (7 pages) (English language translation provided).
Decision of Rejection for Chinese Patent Application No. 2012800758719, dated Mar. 7, 2017 (8 pages) (English language translation provided).
Notification of Reexamination for Chinese Patent Application No. 201280075871.9, dated May 4, 2018 (English language translation provided) (8 pages).
"Mussel Culture Technology", edited and translated by Liu Anni, Wuzhou Publishing House, East Asian Book Company, p. 24, Sep. 1987 (English language translation provided) (3 pages).
"Mussel culture" edited by the Shandong Aquatic School Mariculture Research and Research Group, Agricultural Press, 1st Edition, pp. 49-51, Nov. 1978 (English language translation provided) (6 pages).
Zhang Fuzhen, "Observation of the habits of larvae and seedlings of purple mussels", Journal of Zoology, No. 3, pp. 129-130, 1963 (English language translation provided) (6 pages).
Notification of Reason for Rejection for Japanese Patent Application No. 2015-559345, dated Feb. 2, 2016 (4 pages) (English language translation provided).
International Search Report for International Application No. PCT/JP2014/082448, dated Mar. 10, 2015 (5 pages) (English language translation provided).
Written Opinion of the International Searching Authority for International Application No. PCT/JP2014/082448, dated Mar. 10, 2015 (9 pages) (English language translation provided).
International Preliminary Report on Patentability for International Application No. PCT/JP2014/082448, dated Jun. 13, 2017 (11 pages) (English language translation provided).
Extended European Search Report for European Patent Application No. 14907701.8, dated Oct. 2, 2017 (5 pages).
Notification of Reason for Refusal for Korean Patent Application No. 10-2017-7007814, dated Jun. 20, 2018 (13 pages) (English language translation provided).
Chemical Method. Marine Life Contamination Countermeasure Manual. Edited by the Japan Society of Electrochemical Society and Marine Organism Contamination Countermeasure, Gihodo Publishing, pp. 106-110 (1991) (English language machine translation provided) (6 pages).
Chlorine Injection. Handbook of Contamination Countermeasures for Power Plant Seawater Facilities. Edited by Thermal and Nuclear Power Engineering Society, Kousesha Kouseikaku Publishing, pp. 118-132 (2014) (English language machine translation provided) (17 pages).
Extended European Search Report for European Patent Application No. 15887495.8, dated Oct. 24, 2017 (9 pages).
First Office Action for Chinese Patent Application No. 201580052149.7 dated May 2, 2018 (English language translation provided) (10 pages).
International Preliminary Report on Patentability for International Application No. PCT/JP2015/059798, dated Oct. 3, 2017 (English language translation provided) (9 pages).
International Search Report for International Application No. PCT/JP2015/059798, dated Apr. 28, 2015 (English language translation provided) (3 pages).
Kawabe, Chlorine. Compendium of Measures Against Large Scale Adherence. Edited by the Japan Society of Electrochemical Society and Marine Organism Contamination Countermeasure, pp. 97-102 (1998) (English language machine translation provided) (8 pages).
Notification of Reason for Refusal for Korean Patent Application No. 10-2017-7008062, dated Jun. 20, 2018 (15 pages) (English language translation provided).
Notification of Reason for Rejection for Japanese Patent Application No. 2015-559343, dated Mar. 15, 2016 (English language translation provided) (4 pages).
Written Opinion of the International Searching Authority for International Application No. PCT/JP2015/059798, dated Apr. 28, 2015 (English language translation provided) (7 pages).
Notification of Reason for Rejection for Japanese Patent Application No. 2015-559347, dated Feb. 9, 2016 (English language translation provided) (4 pages).
Decision of Rejection for Japanese Patent Application No. 2015-559347, dated May 10, 2016 (English language translation provided) (3 pages).
Extended European Search Report for European Patent Application No. 14886901.9, dated Feb. 21, 2017 (7 pages).
International Search Report for International Application No. PCT/JP2014/058009, dated May 20, 2014 (English language translation provided) (5 pages).
Written Opinion of the International Search Authority for International Application No. PCT/JP2014/058009, dated May 20, 2014 (English language translation provided) (9 pages).
International Preliminary Report on Patentability for International Application No. PCT/JP2014/058009, dated Sep. 27, 2016 (English language translation provided) (11 pages).

* cited by examiner

METHOD FOR KILLING PTERIOMORPHIA AND BARNACLES USING LIGHT IRRADIATION

TECHNICAL FIELD

The present invention relates to methods of killing larvae of sessile invertebrates in the settlement stage ("fuchakuki").

BACKGROUND ART

In power plants, such as thermal or nuclear power plants that use seawater as a coolant, marine invertebrates such as barnacles and bivalves including mussels often settle inside of intake structures through which sea water is drawn from the sea and is supplied to condensers as well as outfall structures through which the sea water having passed through the condensers is discharged into the sea. An increased amount of settled marine invertebrates may possibly cause clogging of the coolant passages, resulting in a problem of, for example, reduction in cooling capacity. To deal with the problem, a chlorine-based substance such as a sodium hypochlorite solution or chlorine dioxide is injected into the coolant and thus the settlement of marine invertebrates on the heat exchange pathways has been suppressed (Japanese Patent Laid-open Nos. 7-265867, 11-37666, 2005-144212, 2005-144213, and 2005-144214, and Japanese Patent No. 3605128). Other methods have also been developed which use a photocatalyst (Japanese Patent Laid-open No. 11-278374) or a laser beam (Japanese Patent Laid-open Nos. 2003-301435, 06-218367, and 08-164384).

SUMMARY OF THE INVENTION

Problem to be Solved by the Invention

An object of the present invention is to provide methods of killing larvae of sessile invertebrates in the settlement stage.

Means to Solve the Problem

The present inventors found that larvae in the settlement stage tend to stop activity such as swimming and eventually be killed when they are irradiated with an LED beam including the spectrum of 409 to 412 nm. The present invention was thus completed.

One aspect of the present invention is a method of killing a larva of a sessile invertebrate in a settlement stage in water, including the step of irradiating light including the spectrum of 409 to 412 nm, to the larva in the settlement stage. It is preferable that the light includes the spectrum of a part of 400 to 440 nm. It is preferable that the light has a peak in the wavelength range between 409 nm and 412 nm. It is preferable that the light includes the spectrum of 400 to 420 nm. It is preferable that the light irradiated to the larva in the settlement stage has the maximum intensity of 146.4643 $\mu Wcm^{-2}nm^{-1}$ or higher in the wavelength range between 409 nm and 412 nm. It is preferable that the light is irradiated for 3 hours or more. The light may not a laser beam. The light may be an LED beam. The water may be seawater. The larva in the settlement stage may be a pediveliger or a plantigrade of *Mytilus galloprovincialis* or a cypris larva of *Megabalanus rosa*.

EMBODIMENTS FOR CARRYING OUT THE INVENTION

The objects, features, advantages, and ideas of the present invention are apparent to those skilled in the art from consideration of the description of the present specification. Furthermore, those skilled in the art can easily reproduce the present invention from the description of the present specification. The mode and the specific example described below represent a preferable embodiment of the present invention, which is given for the purpose of illustration or description. The present invention is not limited thereto. It is obvious to those skilled in the art that various changes and modifications may be made according to the descriptions of the present specification without departing from the spirit and scope of the present invention disclosed herein.

The method of killing a larva of a sessile invertebrate in a settlement stage in water according to the present invention includes the step of irradiating light including the spectrum of 409 to 412 nm, to the larva in the settlement stage. It is thus possible to kill larvae in the settlement stage.

Target sessile invertebrates are animals that drift in the sea in the early larval stage and then settle on an appropriate substrate during the larval settlement stage to metamorphose into adults. The sessile invertebrates include mussels and barnacles. To kill the larvae of sessile invertebrates in the settlement stage in water is preferably performed, but not limited to, in seawater. Instead, it may be performed in freshwater or salt water with a concentration different from seawater, such as a mixture of freshwater and seawater.

Mussel is the common name for bivalve mollusks in the family Mytilidae and it includes, for example. Modiolinae such as *Modiolus nipponicus*, Lithophaginae such as *Lithophaga curta*, Crenellinae such as *Arvella manshurica* and *Musculista senhousia*, and Mytilinae such as *Mytilus coruscus*. *Limnoperna fortunei*, and *Mytilus galloprovincialis*. Barnacle is the common name for those classified into the superorder Thoracica in the infraclass Cirripedia in the subphylum Crustacea and it includes, for example, those in the suborder of Balanomorpha such as *Amphibalanus amphitrite, Amphibalanus eburneus. Megabalanus rosa, Balanus trigonus, Megabalanus volcano, Amphibalanus reticulatus, Chthamalus challengeri, Fistulobalanus albicostatus*, and *Amphibalanus improvisus*.

The target developmental stage of the larvae to be irradiated with light is preferably the larval settlement stage. This is because the present invention can prevent settlement of the larvae in the settlement stage onto a substrate. For mussels, larvae in the settlement stage are equivalent to pediveligers and plantigrades. For barnacles, larvae in the settlement stage are equivalent to cypris larvae. The substrate to which the larvae in the settlement stage are expected to settle is not particularly limited; examples include seawater intake and outfall systems in power plants, coastal aquaculture facilities or fishery facilities.

The light to be irradiated to larvae in the settlement stage includes the spectrum of 409 to 412 nm. The light preferably includes the spectrum of a part of 400 to 440 nm. The term "a part" is intended not to include "full" in this specification. It is preferable that the light includes the full spectrum of 440 to 420 nm. The light may include the spectrum of ultraviolet (meaning wavelengths shorter than 400 nm), visible light (meaning wavelengths of 400 to 830 nm), and/or infrared (meaning wavelengths longer than 830 nm). Light with wavelengths in the range between 400 nm and 420 nm can be transmitted better through seawater than ultraviolet light. Accordingly, the present invention can have effects of light on a larger area compared with methods using light in the ultraviolet range only. In addition, as shown in Examples, it is preferable that the light has a peak in the wavelength range between 409 nm and 412 nm. This light may not be a laser beam.

The intensity and time length of the irradiation of the light to larvae in the settlement stage are not specifically limited and can appropriately and easily be determined by those skilled in the art depending on the environment to be irradiated (e.g., quality, depth, and clarity of the water). The spectral irradiance at a position of a larva in the settlement stage is preferably 89.6946 $\mu Wcm^{-2}nm^{-1}$ or higher, more preferably 122.1344 $\mu Wcm^{-2}nm^{-1}$, and most preferably, 146.4643 $\mu Wcm^{-2}nm^{-1}$ or higher, in a part or full range of 409 to 412 nm. The time length of the irradiation is preferably 3 hours or more, more preferably, 6 hours or more, yet more preferably 9 hours or more, and most preferably, 12 hours or more. The time length of the irradiation with the light of 89.6946 $\mu Wcm^{-2}nm^{-1}$ or lower is preferably 15 hours or more, more preferably 1 day or more, yet more preferably 2 days or more, and most preferably, 1 week or more. The irradiation can be continuous or intermittent. When the irradiation is intermittent, the total time of irradiation of the light is preferably as described above.

The irradiation method is not particularly limited, but it can utilize devices such as an LED emitter, a mercury lamp, and a fluorescent tube as the irradiator. An LED emitter is preferred.

EXAMPLE

==Device for LED Beam Irradiation==

A rectangular parallelepiped device with a lid which can shield the content inside from external light was prepared. This rectangular parallelepiped device has inner dimensions of 17.5 cm length, 17.5 cm width, and 10.0 cm depth. The inside of the box is lined with a black polyvinyl chloride. For experiments under light conditions, an LED panel was attached to the lid of the device and a stage was placed at the position 5 cm away from the LED panel within the device. In the experiments, each Petri dish containing a larva was set on the stage and an LED beam was vertically irradiated to the larvae from above. For experiments under dark conditions, a device without any LED panel was used.

For LED panels in the device, a panel (LED panel model: ISL-150X150UU375TPNL manufactured by CSS Inc.) with LED light-emitting elements with a peak in the wavelength range between 370 and 380 nm, a panel (LED panel model: ISL-150X150-VV-TPNL manufactured by CSS Inc.) with LED light-emitting elements with a peak in the wavelength range between 409 and 412 nm, or a panel (LED panel model: ISL-150X150-GG-TPNL manufactured by CSS Inc.) with LED light-emitting elements with a peak in the wavelength range between 515 and 535 nm were used. Wavelength characteristics of each LED beam are given in Table 1.

TABLE 1

Wavelength characteristics of each LED beam used in experiments

| Peak wavelength (nm) | 370-380 | 410-412 | 440-460 | 460-480 | 515-535 |
|---|---|---|---|---|---|
| Half-power angle (degree) | ±45 | ±65 | ±55 | ±55 | ±55 |
| Half width (nm) | 15 | 15 | 20 | 25 | 40 |

The spectral irradiances at the peak of an LED light-emitting element that emits light with a peak in the wavelength range between 409 and 412 nm at a position 5 cm away from the LED panel were 32.9250 $\mu Wcm^{-2}nm^{-1}$, 89.6946 $\mu Wcm^{-2}nm^{-1}$, and 138.3543 $\mu Wcm^{-2}nm^{-1}$ when the irradiances were 15 W/m², 50 W/m², and 80 W/m², respectively.

==Selection of Cypris Larvae of *Megabalanus rosa*==

Cypris larvae of a sessile invertebrate *Megabalanus rosa*, which are larvae in the settlement stage, were irradiated with a projection light beam with irradiance of 100 W/m² for at least 1 hour until just before the beginning of the experiment. Animals that exhibited a positive phototaxis and active swimming behavior were used for the following experiments.

==Irradiation of LED Beam to Cypris Larvae of *Megabalanus rosa*==

Cypris larvae were placed in a Petri dish containing 20 ml of seawater (water depth: 1 cm) at 22° C. filtered through a 3-μm membrane filter (ADVANTEC), and the dish was set on a stage inside the device. The device was covered with a lid and an LED beam was irradiated.

The Petri dish was removed from the device 3 hours after the irradiation and the larvae were observed using a stereomicroscope. The observation of the larvae was performed for 10 minutes. Larvae that were lying on the back on the bottom of the Petri dish and only slightly moving their first antennae and cirri without swimming during the observation period were counted as a "weakened larva." Larvae that did not show any sign of motion inside their bodies and did not move first antennae and cirri at all as well as larvae of which parts inside the body including the cirri were exposed outside from the shell (carapase) were counted as a "dead larva" and were removed from the Petri dish. In order to suppress the increase in temperature of the seawater due to the heat from the LED light-emitting elements, half (10 ml) of the seawater in the Petri dish was replaced with 10 ml of seawater at about 22° C. The Petri dish was then returned to the inside of the device and irradiation of the LED beam was resumed.

The aforementioned operation was repeated 4 times every 3 hours to irradiate the larvae with light for 12 hours in total. The conditions and results of the experiments are given in Table 2. The irradiances in the "irradiation conditions" in Table 2 are values measured at a position 5 cm away from the LED panel. Any effect of the temperature can be eliminated from consideration because the temperature of the seawater during the experiments was 26° C. or lower.

TABLE 2

Number of swimming, weakened, and dead cypris larvae of *Megabalanus rosa* irradiated with LED beam

| irradiation conditions | number of larvae swimming before irradiation | after 3-hour irradiation | | | after 6-hour irradiation | | | after 9-hour irradiation | | | after 12-hour irradiation | | |
|---|---|---|---|---|---|---|---|---|---|---|---|---|---|
| | | number of swimming larvae | number of weakened larvae | number of dead larvae | number of swimming larvae | number of weakened larvae | number of dead larvae | number of swimming larvae | number of weakened larvae | number of dead larvae | number of swimming larvae | number of weakened larvae | number of dead larvae |
| dark condition | 11 | 11 | 0 | 0 | 11 | 0 | 0 | 11 | 0 | 0 | 11 | 0 | 0 |
| 370_380 15 W/m2 | 11 | 11 | 0 | 0 | 11 | 0 | 0 | 11 | 0 | 0 | 11 | 0 | 0 |

TABLE 2-continued

Number of swimming, weakened, and dead cypris larvae of *Megabalanus rosa* irradiated with LED beam

| irradiation conditions | number of larvae swimming before irradiation | after 3-hour irradiation | | | after 6-hour irradiation | | | after 9-hour irradiation | | | after 12-hour irradiation | | |
|---|---|---|---|---|---|---|---|---|---|---|---|---|---|
| | | number of swimming larvae | number of weakened larvae | number of dead larvae | number of swimming larvae | number of weakened larvae | number of dead larvae | number of swimming larvae | number of weakened larvae | number of dead larvae | number of swimming larvae | number of weakened larvae | number of dead larvae |
| 409_412 50 W/m2 | 13 | 0 | 13 | 0 | 0 | 10 | 3 | 0 | 10 | 3 | 0 | 0 | 13 |
| 409_412 85 W/m2 | 10 | 0 | 0 | 10 | — | — | — | — | — | — | — | — | — |
| 515_535 50 W/m2 | 12 | 12 | 0 | 0 | 12 | 0 | 0 | 12 | 0 | 0 | 12 | 0 | 0 |

The cypris larvae of *Megabalanus rosa* irradiated with an LED beam having a peak in the wavelength range between 370 nm and 380 nm (15 W/m$^2$) or between 515 nm and 535 nm (50 W/m$^2$) were not weakened after the irradiation for 12 hours. These larvae were observed to be actively swimming as in the case of the dark condition.

In contrast the larvae irradiated with an LED beam having a peak in the wavelength range between 409 nm and 412 nm under the irradiation condition of 50 W/m$^2$ were alive but weakened after the irradiation of 3 hours. They were dull compared with prior to the LED irradiation, and significantly weakened compared with those irradiated with the LED beam having a peak in the wavelength range between 370 nm and 380 nm or between 515 nm and 535 nm. As time elapses, the number of dead animals increased and all larvae were dead after the 12-hour irradiation. All larvae were dead after the 3-hour irradiation under the irradiation condition of 85 W/m$^2$.

==Irradiation of LED Beams to Pediveligers and Plantigrades of *Mytilus galloprovincialis*==

Experiments were performed using pediveligers and plantigrades of *Mytilus galloprovincialis* as in the case of cypris larvae of *Megabalanus rosa* except that the animals that closed their shell with their velum and foot contained in the shell without any swimming or crawling during the 10-minute observation were counted as a "shell-closing animal" and those that showed no movement of gills were counted as a "dead animal." The conditions and results of the experiments are given in Tables 3 and 4. The irradiances in the "irradiation conditions" in Tables 3 and 4 are values measured at a position 5 cm away from the LED panel.

The temperature of the seawater was increased up to 28° C. when an LED beam having a peak in the wavelength range between 409 nm and 412 nm was irradiated at an irradiance of 85 W/m$^2$. Accordingly, in order to examine an effect, if any, of the increase in temperature of the seawater on the larvae, five pediveligers and five plantigrades were fed in seawater at 28° C. under dark conditions. Observation after 12 hours showed that all animals did not close their shell and did not die, and exhibited active exploring and/or crawling behaviors as before the experiments. This indicated that experimental condition of 28° C. or lower will not affect larvae.

TABLE 3

Number of swimming, shell-closing, and dead pediveligers of *Mytilus galloprovincialis* irradiated with LED beam

| irradiation conditions | number of larvae swimming before irradiation | after 3-hour irradiation | | | after 6-hour irradiation | | | after 9-hour irradiation | | | after 12-hour irradiation | | |
|---|---|---|---|---|---|---|---|---|---|---|---|---|---|
| | | number of swimming pediveligers | number of shell-closing pediveligers | number of dead pediveligers | number of swimming pediveligers | number of shell-closing pediveligers | number of dead pediveligers | number of swimming pediveligers | number of shell-closing pediveligers | number of dead pediveligers | number of swimming pediveligers | number of shell-closing pediveligers | number of dead pediveligers |
| dark condition | 5 | 5 | 0 | 0 | 5 | 0 | 0 | 5 | 0 | 0 | 5 | 0 | 0 |
| 370_380 15 W/m2 | 5 | 5 | 0 | 0 | 5 | 0 | 0 | 0 | 5 | 0 | 0 | 5 | 0 |
| 409_412 15 W/m2 | 5 | 0 | 5 | 0 | 0 | 5 | 0 | 0 | 5 | 0 | 0 | 5 | 0 |
| 409_412 50 W/m2 | 5 | 0 | 0 | 0 | 0 | 5 | 0 | 0 | 5 | 0 | 0 | 3 | 2 |
| 409_412 85 W/m2 | 5 | 0 | 0 | 5 | — | — | — | — | — | — | — | — | — |
| 515_535 50 W/m2 | 5 | 5 | 0 | 0 | 5 | 0 | 0 | 5 | 0 | 0 | 5 | 0 | 0 |

The pediveligers of *Mytilus galloprovincialis* irradiated with an LED bean having a peak in the wavelength range between 370 nm and 380 nm (15 W/m$^2$) started to close their shells after 9 hours but did not die after 12 hours. Those irradiated with an LED beam having a peak in the wavelength range between 515 nm and 535 nm (50 W/m$^2$) did not close their shell even after 12 hours and their active swimming and crawling were observed as in the case of the dark condition.

In contrast, the pediveligers irradiated with an LED beam having a peak in the wavelength range between 409 nm and 412 nm started to close their shells after 3 hours under the irradiance conditions of 15 W/m$^2$ and 50 W/m$^2$. Dead pediveligers were observed after 12 hours under the irradiance condition of 50 W/m². Animals that were alive after 12 hours under the irradiation condition of 50 W/m² were weakened to the extent that movement of their gills was slightly observed. They were significantly weakened as compared to the animals irradiated with the LED beam having a peak in the wavelength range between 370 nm and 380 nm or with the LED beam having a peak in the wavelength range between 515 nm and 535 am for 12 hours. All pediveligers died after 3 hours under the irradiance condition of 85 W/m².

Furthermore, since the present invention could be used to kill both the larvae in the settlement stage of *Megabalanus rosa*, which is an arthropod, and the larvae in the settlement stage of *Mytilus galloprovincialis*, which is a mollusk, although they are phylogenetically different from each other, it was expected that similar effects are obtained on larvae in the settlement stage of a wide range of animal species by irradiation of light including the spectrum of 409 to 412 nm.

TABLE 4

Number of swimming, shell-closing, and dead plantigrades of *Mytilus galloprovincialis* irradiated with LED beam

| irradiation conditions | number of larvae swimming before irradiation | after 3-hour irradiation | | | after 6-hour irradiation | | | after 9-hour irradiation | | | after 12-hour irradiation | | |
|---|---|---|---|---|---|---|---|---|---|---|---|---|---|
| | | number of swimming plantigrades | number of shell-closing plantigrades | number of dead plantigrades | number of swimming plantigrades | number of shell-closing plantigrades | number of dead plantigrades | number of swimming plantigrades | number of shell-closing plantigrades | number of dead plantigrades | number of swimming plantigrades | number of shell-closing plantigrades | number of dead plantigrades |
| dark condition | 5 | 5 | 0 | 0 | 5 | 0 | 0 | 5 | 0 | 0 | 5 | 0 | 0 |
| 370_380 15 W/m2 | 5 | 5 | 0 | 0 | 5 | 0 | 0 | 0 | 5 | 0 | 0 | 5 | 0 |
| 409_412 15 W/m2 | 5 | 5 | 0 | 0 | 5 | 0 | 0 | 0 | 5 | 0 | 0 | 5 | 0 |
| 409_412 50 W/m2 | 5 | 5 | 0 | 0 | 0 | 5 | 0 | 0 | 5 | 0 | 0 | 4 | 1 |
| 409_412 85 W/m2 | 5 | 0 | 0 | 5 | — | — | — | — | — | — | — | — | — |
| 515_535 50 W/m2 | 5 | 5 | 0 | 0 | 5 | 0 | 0 | 5 | 0 | 0 | 5 | 0 | 0 |

The plantigrades of *Mytilus galloprovincialis* irradiated with an LED beam having a peak in the wavelength range between 370 nm and 380 nm (15 W/m²) started to close their shells after 9 hours but did not die after 12 hours, as in the case of pediveligers. Those irradiated with an LED beam having a peak in the wavelength range between 515 nm and 535 nm (50 W/m²) did not close their shell even after 12 hours. Their active swimming and crawling were observed as in the case of the dark condition.

In contrast, the plantigrades irradiated with an LED beam having a peak in the wavelength range between 409 nm and 412 nm were observed to start to close their shells after 9 hours under the irradiance condition of 15 W/m². All animals closed their shells after 6 hours and dead plantigrades were observed after 12 hours under the irradiance condition of 50 W/m². Animals that were alive after 12 hours under the irradiance condition of 50 W/m² were weakened to the extent that movement of their gills was slightly observed. They were significantly weakened as compared to the animals irradiated with the LED beam having a peak in the wavelength range between 370 nm and 380 nm or with the LED beam having a peak in the wavelength range between 515 nm and 535 nm for 12 hours. All pediveligers died after 3 hours under the irradiance condition of 85 W/m².

As described above, it was found that, in order to weaken and kill larvae in the settlement stage of Pteriomorphia and barnacles in water, irradiation of light including the spectrum of 409 to 412 nm to the larvae is significantly effective compared with light including the spectrum of other wavelengths.

INDUSTRIAL APPLICABILITY

The present invention makes it possible to provide methods of killing larvae of sessile invertebrates in the settlement stage in water.

The invention claimed is:

1. A method of killing a larva of a sessile invertebrate in a settlement stage in water, comprising the step of irradiating light consisting of a part of a spectrum of 400 nm to 440 nm to the larva in the settlement stage, wherein the light irradiating the larva in the settlement stage has a peak wavelength in a range between 409 nm and 412 nm.

2. The method according to claim 1, wherein the part of the spectrum consists of a part of a spectrum of 400 nm to 420 nm.

3. The method according to claim 2, wherein the light is not a laser beam.

4. The method according to claim 1, wherein the light irradiated to the larva in the settlement stage has a maximum spectral irradiance of 146.4643 µWcm$^{-2}$ nm$^{-1}$ or higher in a wavelength range between 409 nm and 412 nm.

5. The method according to claim 4, wherein the light is not a laser beam.

6. The method according to claim 1, wherein the light is irradiated for 3 hours or more.

7. The method according to claim 6, wherein the light is not a laser beam.

8. The method according to claim 1, wherein the light is not a laser beam.

9. The method according to claim 1, wherein the light is an LED beam.

10. The method according to claim 9, wherein the light is not a laser beam.

11. The method according to claim 1, wherein the water is seawater.

12. The method according to claim 11, wherein the light is not a laser beam.

13. The method according to claim 1, wherein the larva in the settlement stage is a pediveliger or a plantigrade of *Mytilus galloprovincialis* or a cypris larva of *Megabalanus rosa*.

14. The method according to claim 13, wherein the light is not a laser beam.

15. The method according to claim 1, wherein the part of the spectrum consists of a spectrum of 400 nm to 420 nm.

* * * * *